July 30, 1940.
G. ZIMMERMANN
2,209,896
DIRECTION INDICATOR
Filed July 12, 1935
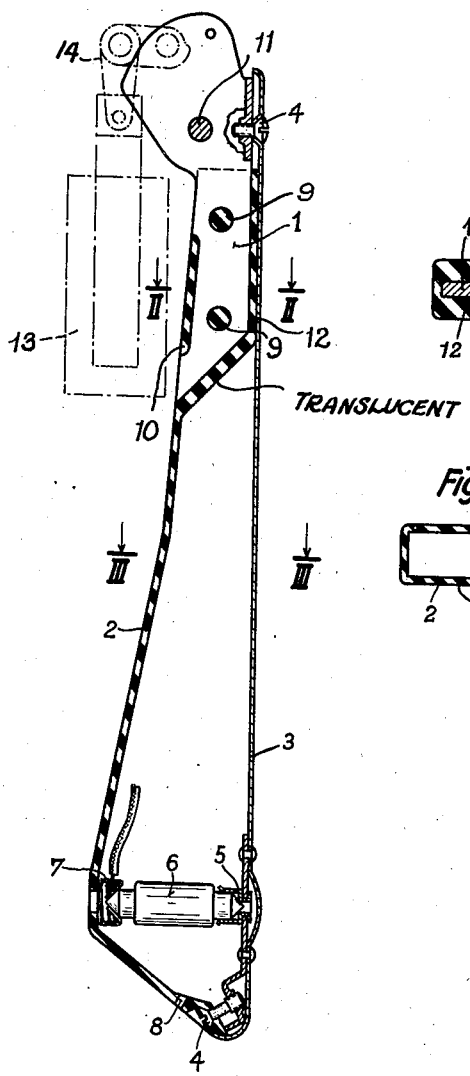
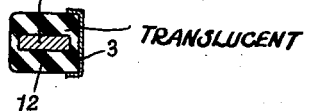
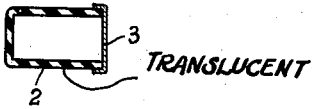
Inventor
Gustav Zimmermann
by Steward & McKay
his attorneys Patented July 30, 1940

2,209,896

UNITED STATES PATENT OFFICE 2,209,896

DIRECTION INDICATOR

Gustav Zimmermann, Stuttgart-Munster, Germany, assignor to Robert Bosch Gesellschaft mit beschränkter Haftung, Stuttgart, Germany Application July 12, 1935, Serial No. 31,105
In Germany March 19, 1935

5 Claims. (Cl. 177—329)

The present invention relates to direction indicators of the indicating arm type, intended more especially for vehicles. In these indicators, the movable indicating arm was hitherto provided, as a rule, with two transluscent panes, which were held in a sheet metal frame.

In order to simplify the manufacture, the indicating arm according to this invention has a trough- or pouch-shaped casing of pressed light-transmitting material, the open side of which is closed by a cover. Preferably, at the same time a holder member for the lamp of the indicating arm is provided on this cover.

The thickness of the side walls of the trough may be suitably chosen with regard to the nature of the particular material employed so as to ensure adequate transmission of light through the side walls.

An example of construction of the invention is shown in the accompanying drawing, in which:
Figure 1 is a longitudinal section
Figure 2 a section on the line II—II in Figure 1, and
Figure 3 a section on the line III—III in Figure 1.

The indicating arm has a sheet metal bearing plate 1 pivoted at 11 and which has a synthetic resin mass 12 pressed round it, and on to which a trough-shaped casing 2 of the same pressed material is pressed. The bearing plate 1 is provided with a plurality of holes 9 and a recess 10 so that when the resin material 12 is pressed around said bearing plate, said holes and recess are filled with the resin mass to firmly anchor the bearing plate therein. The open side of the casing 2 is closed by a sheet metal cover 3, which is removably secured by two screws 4 to the indicating arm. The cover 3 has a non-insulated lamp-holding member 5 for a tubular lamp 6, the other insulated holder member 7 of which can be inserted in the casing 2. A hole is provided at 8 for the discharge of any water which may penetrate into the casing.

The cover 3 forms at the same time a part of the ground connection for the non-insulated pole of the incandescent electric lamp 6.

The pressed material consists of a light-transmitting synthetic resin which can be easily colored, and the color of which can be suitably selected.

The pouch-shaped form of the casing of the indicating arm permits of the use of a simple press mould, which is desirable because it makes it possible to provide a strong simple structure quickly and at low cost. The walls of the casing 2 may be quite smooth, both inside as well as outside.

In order to move the indicating arm from the position of repose shown in the drawing into the indicating position, a suitable operating device, such for example as an electromagnet, Bowden wire or the like may be used. In the example illustrated, an electro-magnet indicated generally by 13 operates through the pivoted connection 14 to swing the indicating arm on its pivot 11 when the electro-magnet is energized.

The lamp can be secured and changed in a different way from that illustrated.

I declare that what I claim is:

1. A direction indicator for motor vehicles comprising a translucent one piece, molded, plastic arm having a shank portion and a molded chamber portion, the chambered portion having opposed and substantially parallel sides integrally joined along one longitudinal edge and opened along the opposite longitudinal edge of the arm to permit access to the chamber thereof, and a removable cover for the open side of the chamber and means for attaching the cover to the arm.

2. The combination in the preceding claim, wherein the removable cover comprises a flat portion and flanges forming a channel shaped member, said flanges being disposed in close parallel relation to the edges of the chambered portion whereby the closure is accurately positioned relative to the edges of the chambered portion.

3. In a direction indicator for vehicles, a one-piece translucent movable indicating arm formed of electrical-insulating plastic material and having a chamber portion, the chambered portion having opposed and substantially parallel sides joined along one longitudinal edge and opened along the opposite longitudinal edge of the arm to permit access to the chamber thereof, a removable metallic cover for the open side of the chamber, an electric lamp in said chamber, and contacts for said lamp, one of said contacts being secured to said chamber and the other being secured to said cover.

4. In a direction indicator for vehicles, a one-piece indicating arm formed of light-transmitting plastic and having a casing portion, said casing portion having opposed and substantially parallel sides integrally joined along one longitudinal edge and open along the opposite longitudinal edge of the arm to permit access to the casing thereof, a removable cover for the open side of said casing and detachably connected thereto, and a bearing plate secured to and pivotally mounting said arm.

5. A direction indicator for motor vehicles comprising a translucent one-piece, molded, plastic arm having a shank portion and a molded chamber portion, the chambered portion having opposed and substantially parallel sides integrally joined along one longitudinal edge and opened along the opposite longitudinal edge of the arm to permit access to the chamber thereof, a removable cover for the open side of the chamber, means for attaching the cover to the arm, and a bearing plate embedded in and reinforcing said shank portion for pivotally mounting said arm.

GUSTAV ZIMMERMANN.